United States Patent [19]
Reiner et al.

[11] Patent Number: 5,875,450
[45] Date of Patent: Feb. 23, 1999

[54] DEVICE FOR PROCESSING AND STORING DATA RECEIVED FROM EITHER A CONTACTLESS INTERFACE OR AN INTERFACE HAVING CONTACTS

[75] Inventors: Robert Reiner, Unterhaching; Joachim Weitzel, Markt Indersdorf; Heiko Fibranz, München; Gerhard Schraud, Mering; Walter Strubel, Seefeld, all of Germany; Dominik Berger, Graz, Austria; Wolfgang Eber, Graz, Austria; Gerald Holweg, Graz, Austria

[73] Assignees: Siemens Aktiengesellschaft, Munich, United Kingdom; U.S. Philips Corporation, New York, N.Y.

[21] Appl. No.: 795,079

[22] Filed: Feb. 5, 1997

[30] Foreign Application Priority Data

Feb. 5, 1996 [DE] Germany .......................... 196 04 045.0

[51] Int. Cl.⁶ ..................................................... G06F 13/00
[52] U.S. Cl. ............................ 711/104; 395/882; 395/823
[58] Field of Search .................................... 711/104, 102, 711/149; 395/882, 823

[56] References Cited

U.S. PATENT DOCUMENTS

| | | | |
|---|---|---|---|
| 5,327,018 | 7/1994 | Karlish et al. | 327/415 |
| 5,584,043 | 12/1996 | Burkart | 395/882 |
| 5,598,032 | 1/1997 | Fidalgo | 257/679 |
| 5,613,159 | 3/1997 | Colnot | 395/831 |

*Primary Examiner*—Tod R. Swann
*Assistant Examiner*—Esteban Rockett
*Attorney, Agent, or Firm*—Herbert L. Lerner; Laurence A. Greenberg

[57] ABSTRACT

A device for processing and storing data, in particular a chip card, includes a first interface with contacts and a second contactless interface for receiving energy or power from and for communication with a terminal device. A first controllable switching device connects either the first or the second interface to a non-volatile semiconductor memory through address, data and control lines. A logic circuit drives the first controllable switching device. A second controllable switching device disposed between the first controllable switching device and the memory can be driven at least by the logic circuit and an address signal present on the address lines.

9 Claims, 1 Drawing Sheet

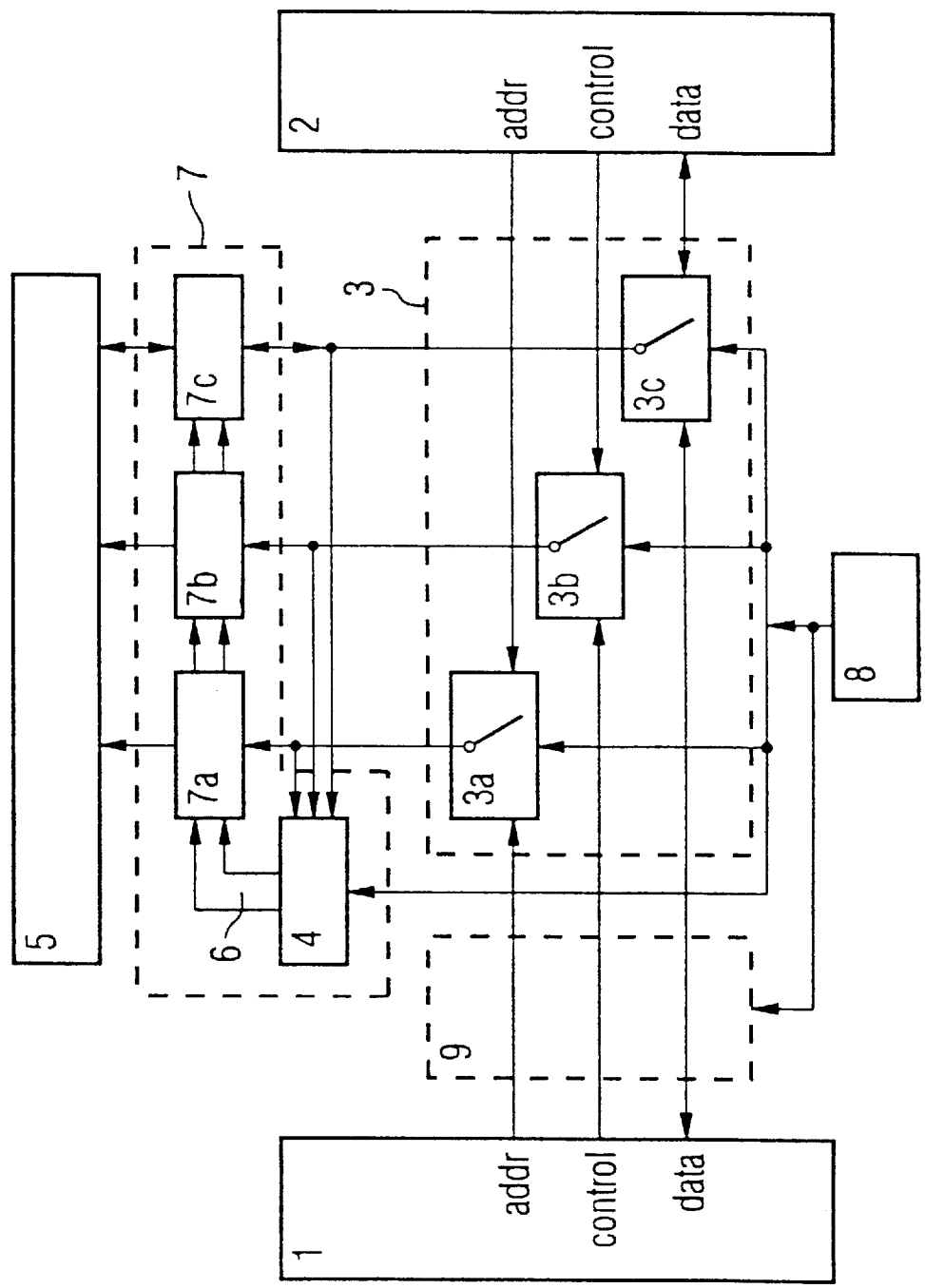

DEVICE FOR PROCESSING AND STORING DATA RECEIVED FROM EITHER A CONTACTLESS INTERFACE OR AN INTERFACE HAVING CONTACTS

BACKGROUND OF THE INVENTION

Field of the Invention

The invention relates to a device for processing and storing data, in particular a chip card, having a first interface with contacts and a second contactless interface for receiving energy or power from and for communication with a terminal device, a nonvolatile semiconductor memory, a controllable switching device through which either the first or the second interface can be connected to the semiconductor memory through address, data and control lines, and a logic circuit which drives the controllable switching device.

Such a device is known from German Patent DE 39 35 364 C1. The combined chip card disclosed therein can be supplied with power both by galvanic contacting and contactlessly by inductive coupling through the use of a transmitting unit. Data exchange also takes place by both types of transmission, with power and data being fed from the contact interface directly through a multiplexer to a processing unit and a memory, whereas in the case of the contactless type of transmission a circuit which is disposed between the inductive interface and the multiplexer obtains the data and a d.c. voltage from a radio-frequency signal that is received, or modulates a carrier signal to be transmitted with a data signal in order to feed the signals through the multiplexer to the processing unit and the memory or to receive them from there.

The form of such combined chip cards is admittedly customary nowadays, but other forms of such devices are also conceivable for the processing and storing of data. Keys are also currently in common use and watches have also been proposed. A conceivable possible use of such combined chip cards is to be seen in local transport, where passengers have a card in their pocket or bag with a memory storing a value of money that is reduced by the price of the journey through the contactless type of transmission when they board a type of transport. After the value of the money has been used up, the memory can be "recharged" at a bank terminal, preferably by the type of transmission with contacts, in such a way that the same amount is debited from a current account or has to be inserted in cash.

However, in the case of the known chip card both types of transmission are of entirely equal ranking and, moreover, the multiplexer is automatically switched over to that type of transmission from which the higher supply voltage is coming.

In the case of almost all of the forms in which the known chip card is used, in which a datum stored in the memory corresponds to a value of money that may be used for paying for goods or services and which can be increased again at a bank terminal, for example, in order to make it possible to reuse the card, it is desirable however if this "recharging" is possible only by the type of transmission with contacts. The "recharging" of the card is a highly sensitive operation which necessitates a series of security precautions that cannot be accomplished in contactless data transmissions, since it is not even possible to construct the device for transmission in such a way that it is immune to interception. However, in the case of the type of transmission with contacts, it is already known to allow communication between a card and a terminal in which the card is inserted to be established only when the card is inaccessible in a lockable insert compartment of the terminal.

SUMMARY OF THE INVENTION

It is accordingly an object of the invention to provide a device for processing and storing data, which overcomes the hereinafore-mentioned disadvantages of the heretofore-known devices of this general type and which does so with a different transmission procedure that makes it possible to access the memory selectively with regard to the transmission procedure.

With the foregoing and other objects in view there is provided, in accordance with the invention, a device for processing and storing data, in particular a chip card, comprising a first interface with contacts, and a second contactless interface for receiving power or energy from and communicating with a terminal device; a non-volatile semiconductor memory; address, data and control lines; a first controllable switching device for connecting one of the interfaces through the address, data and control lines to the semiconductor memory; a logic circuit driving the first controllable switching device; and a second controllable switching device connected between the first controllable switching device and the memory, the second controllable switching device to be driven at least by the logic circuit and an address signal present on the address lines.

The first controllable switching device according to the invention can interrupt or close the connection between the control switch and the memory, and consequently between the interfaces and the memory, depending on the position of the controllable switch and the memory address, and can consequently make selective access to the memory possible. That is to say it is possible to provide memory areas which can be accessed only through the first interface with contacts, and memory areas which can be accessed only through the contactless second interface.

In accordance with another feature of the invention, the second switching device according to the invention can also be driven by the control lines of the memory, so that the selection is also possible on the basis of the memory operation to be executed, such as reading or writing or specific forms thereof. For example, it may be provided that a writing access which increases the value of money stored in the memory is possible only by the type of transmission with contacts.

In accordance with a further feature of the invention, the data to be written or read out may also be used as the selection criterion.

The information on the position of the controllable switch in this case comes from the logic circuit, which drives the switching device with the same signal as the controllable switch itself, or a signal derived from that signal.

In accordance with an added feature of the invention, the logic circuit is a microprocessor, which may be disposed between the first interface and the first controllable switching device. As a result, the address, data and control signals can reach the memory from the first interface only through the microprocessor, thereby providing a further selection possibility.

The configuration of the microprocessor according to the invention makes it possible to effect a switching over of the first controllable switch to the first interface only when an identification and/or authentication procedure has been successfully carried out between a card and a terminal or a user.

In accordance with an additional feature of the invention, which is advantageous in this case in terms of high security, the first controllable switch is a switch which connects the second interface to the memory immediately after the supply voltage is applied and switches over only on the basis of being driven by the microprocessor and returns to the initial state only when the supply voltage is no longer provided.

In accordance with yet another feature of the invention, the first controllable switch may be a component part of the memory, so that the latter is constructed as a dualport memory. The second switching device is then also advantageously constructed as part of the memory.

In accordance with yet a further feature of the invention, a part from a switch, the second switching device contains a switching logic part, which evaluates the address, control and data signals as well as the control signal from the logic circuit, in particular the microprocessor, and, in dependence thereon, actuates the switch or a plurality of switches.

In accordance with yet a concomitant added feature of the invention, the switching logic part may be hard-wired, but is realized particularly advantageously by a ROM, since this makes it possible to set different selection criteria, depending on the application, in a simple way. However, configurations with programmable non-volatile memories such as PROMs, EPROMs or EEPROMs are also possible, but in this case it must be ensured that reprogramming of these memories is not possible, or only under specific conditions.

Other features which are considered as characteristic for the invention are set forth in the appended claims.

Although the invention is illustrated and described herein as embodied in a device for processing and storing data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block circuit diagram of parts of a device which is essential to the invention for processing and storing data. In particular, such a device may be a so-called chip card, in other words a plastic card in credit card format, in which a semiconductor chip is embedded, and which is provided with interfaces in order to be able to transmit power and data to the semiconductor chip. However, the invention can also be used in any other spatial configuration of a device for processing and storing data.

DESCRIPTION OF THE PREFERRED EMBODIMENTS

Referring now in detail to the single FIGURE of the drawing, there is seen a first interface 1 with contacts, which is connected through address lines "addr", control lines "control", and data lines "data", to a first controllable switching device 3. The first controllable switching device 3 is represented in this case by three individual switches 3a, 3b, 3c. Each of the individual switches is intended for one of the three signal lines. However, each of the signal lines, addr, control, data, is usually a number of bits wide, so that consequently each of the individual switches 3a, 3b, 3c is also constructed from a corresponding number of switches.

The first interface 1 can galvanically connect a galvanic contact to a non-illustrated read/write device, which may be a bank terminal. The supply voltages are usually also transmitted through these contacts, but for reasons of overall clarity have been omitted herein.

A second, contactless interface 2 is also connected to the first controllable switching device 3, through corresponding address, control and data lines. The second interface 2 is formed, for example, by a coil, in order to be able to establish a contact with a terminal by inductive coupling. The coil receives a radio-frequency, modulated carrier signal, which is processed in a non-illustrated circuit, in order to obtain the supply voltages and the address, control and data signals therefrom. In the same way, this circuit will modulate onto a radiofrequency carrier the data to be transmitted to a terminal from the device for processing and storing data.

The address, control and data signals from either the first or the second interface 1, 2 are to be fed to a non-volatile semiconductor memory through the first controllable switching device 3, depending on its switching position. The first controllable switching device 3 is driven by a logic circuit 8 for setting a switching position. In an advantageous construction, the first controllable switching device 3 is a switch which connects the second interface 2 to a semiconductor memory 5 immediately after the supply voltage is applied, even if there is no driving signal from the logic circuit 8. It is only by driving with the logic circuit 8 that the first controllable switching device 3 can be switched over, so that the first interface 1 is connected to the semiconductor memory 5. It is only when the supply voltage is no longer provided that this first controllable switching device returns again to its initial state of its own accord. In this way it can be ensured that a driving of the semiconductor memory 5 through the first interface 1 with contacts, can take place only after driving of the first controllable switching device 3 through the logic circuit 8, with it being possible to make the generation of the driving signal dependent on additional conditions.

In a particularly advantageous construction, the logic circuit is formed by microprocessor 9. In a particularly advantageous refinement, this microprocessor is disposed between the first interface 1 and the first controllable switching device 3, so that the address, control and data signals can only be fed to the first controllable switching device 3 through the microprocessor 9. In this way it can be achieved that a switching over of the first controllable switching device 3 to the first interface 1 and a transmission of the address, control and data signals fed in through the first interface 1, only takes place when an identification or authentication procedure has been carried out between the device for processing and storing data and a terminal or a user of the device.

In the manner according to the invention, the first controllable switching device 3 is connected through a second controllable switching device 7 to the semiconductor memory 5. The second switching device 7 is formed in this case by individual switches 7a, 7b, 7c, which can interrupt connection lines between the first controllable switching device 3 and the semiconductor memory 5 or connect them there. The switches 7a, 7b, 7c can be driven by a switching logic part 4 through lines 6. The switching logic part 4 is connected on one hand to address, control and data signal outputs of the first controllable switching device 3 and on the other hand to an output of the logic circuit 8, which drives a control input of the first controllable switching device 3. The switching logic part 4 drives the switches 7a, 7b, 7c in dependence on the switch position and the signals to the address, control and data lines. In this way, different access possibilities to the semiconductor memory 5 can be realized with respect to the interfaces 1, 2, without it being possible for a user to add to them later.

The switching logic part 4 of the second switching device 7 may be hard-wired in this case, but in an advantageous construction it is realized by a ROM. This makes easy user-specific modification of this circuit part possible. In principle, programmable ROMs are also possible, making it even more easily possible to change the selection criteria, but also resulting in an increase in the risks of manipulation, so that further security-specific circuit parts are necessary.

The device according to the invention for processing and storing data with an access path with contacts and a contactless access path makes it possible to realize specific access possibilities for each access path. This takes place in a very simple way without complex circuitry.

We claim:

1. A device for processing and storing data, comprising:
   a first interface with contacts, and a second contactless interface for receiving energy from and communicating with a terminal device;
   a non-volatile semiconductor memory;
   address, data and control lines;
   a first controllable switching device for connecting one of said interfaces through said address, data and control lines to said semiconductor memory;
   a logic circuit driving said first controllable switching device; and
   a second controllable switching device connected between said first controllable switching device and said memory, said second controllable switching device to be driven at least by said logic circuit and an address signal present on said address lines for restricting access to regions of said memory between said first interface with contacts and said second contactless interface.

2. The device according to claim 1, wherein said second controllable switching device is also to be driven by a control signal on said control lines for connecting said first controllable switching device to said memory in dependence thereon.

3. The device according to claim 1, wherein said logic circuit is a microprocessor connected between said first interface and said first controllable switching device.

4. The device according to claim 3, wherein said first controllable switching device is a switch, said switch connecting said second interface to said semiconductor memory immediately after a supply voltage is applied, said switch connecting said first interface to said memory only on the basis of being driven by said microprocessor, and said switch returning to an initial state only when the supply voltage is no longer applied.

5. The device according to claim 1, wherein said second controllable switching device includes switches and a switching logic part.

6. The device according to claim 1, wherein said first controllable switching device is a component part of said memory, and said memory is a dual-port memory.

7. The device according to claim 1, wherein said second controllable switching device is hardwired.

8. The device according to claim 5, wherein said switching logic part of said second controllable switching device is a ROM.

9. The device according to claim 5, wherein said switching logic part of said second controllable switching device is a programmable ROM.

* * * * *

UNITED STATES PATENT AND TRADEMARK OFFICE
CERTIFICATE OF CORRECTION

PATENT NO.   : 5,875,450
DATED        : February 23, 1999
INVENTOR(S)  : Robert Reiner, et. al.

It is certified that error appears in the above-identified patent and that said Letters Patent is hereby corrected as shown below:

Title page, item [73], Assignee: should read as following:

Siemens Aktiengesellschaft, Munich, Germany;
U.S. Philips Corporation, New York, N.Y.

Signed and Sealed this

Twenty-first Day of September, 1999

Attest:

Q. TODD DICKINSON

*Attesting Officer*          *Acting Commissioner of Patents and Trademarks*